Nov. 3, 1964 A. W. RYBERG 3,154,955
MICROWAVE RECEIVER TRACKING MECHANISM
Filed March 16, 1961 5 Sheets-Sheet 1
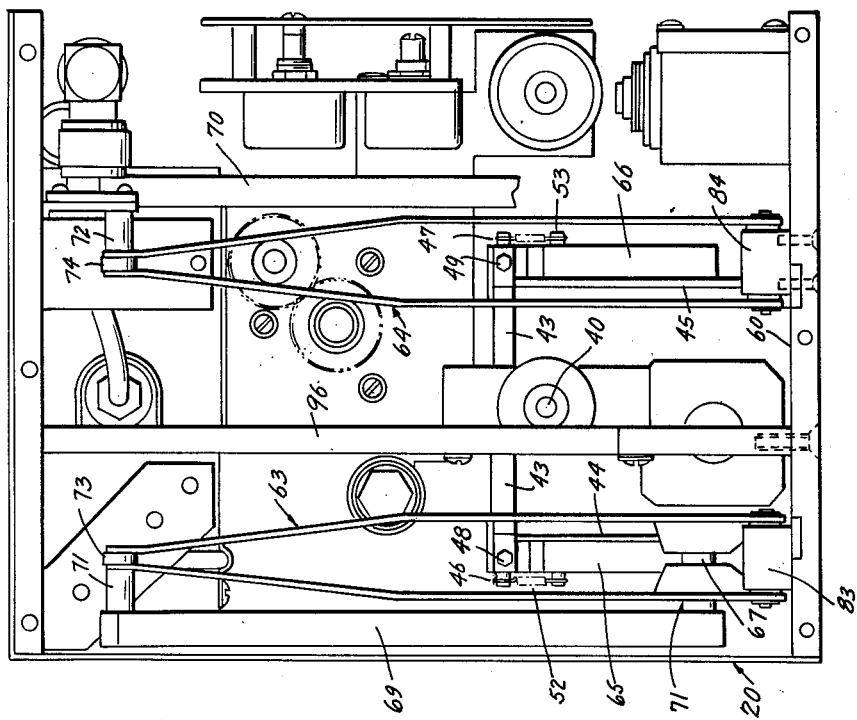
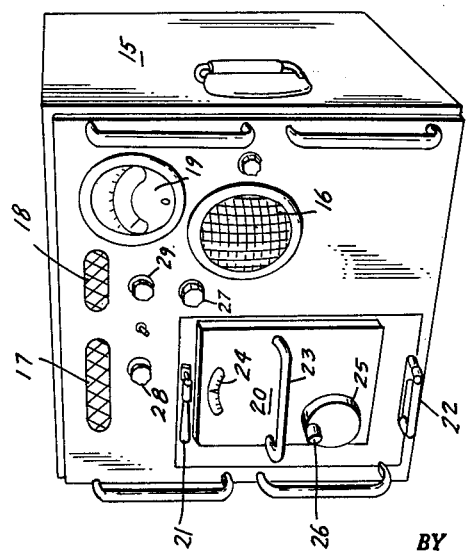
INVENTOR.
ARLING W. RYBERG
BY Richard A. Marsh

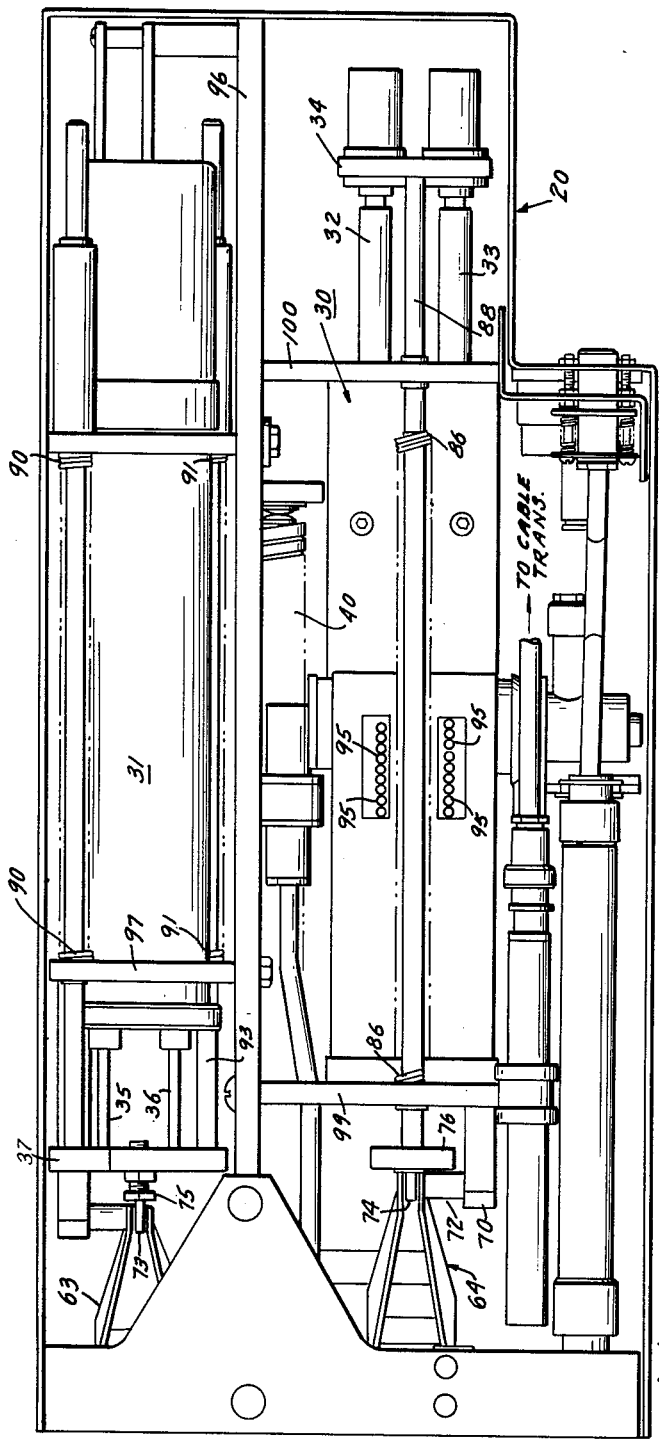

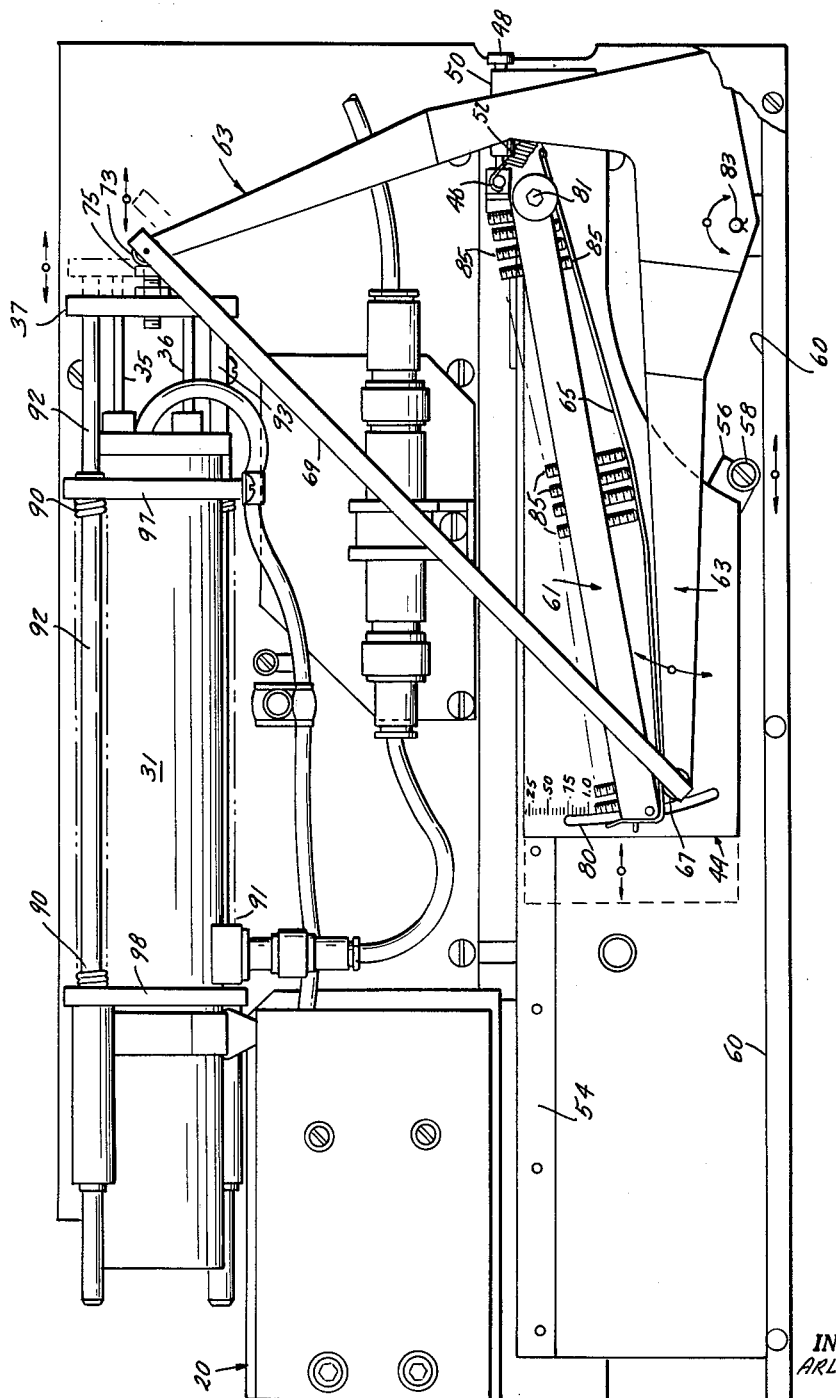
FIG. 4.
INVENTOR.
ARLING W. RYBERG
BY 

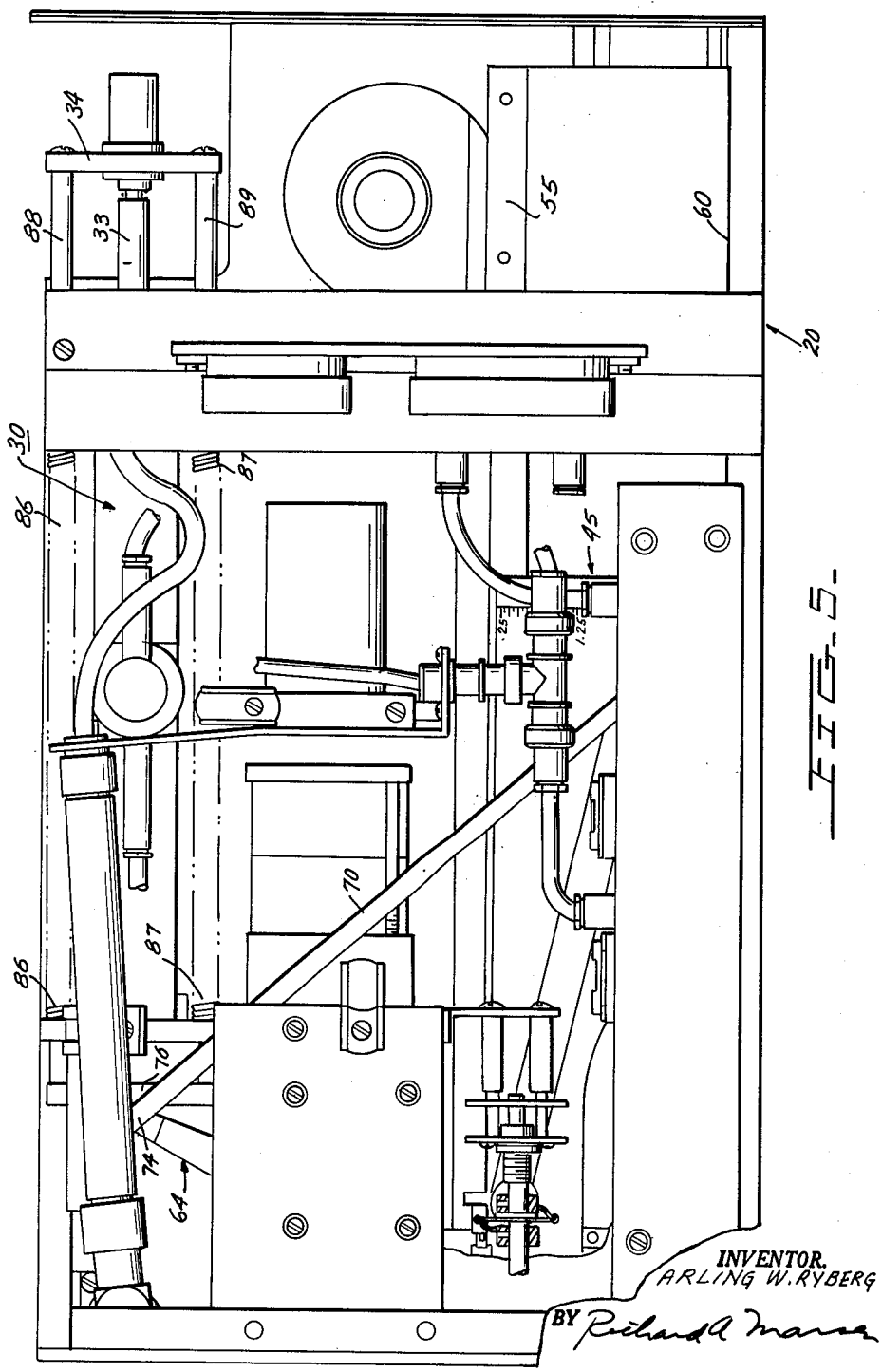

Nov. 3, 1964    A. W. RYBERG    3,154,955
MICROWAVE RECEIVER TRACKING MECHANISM
Filed March 16, 1961    5 Sheets-Sheet 5
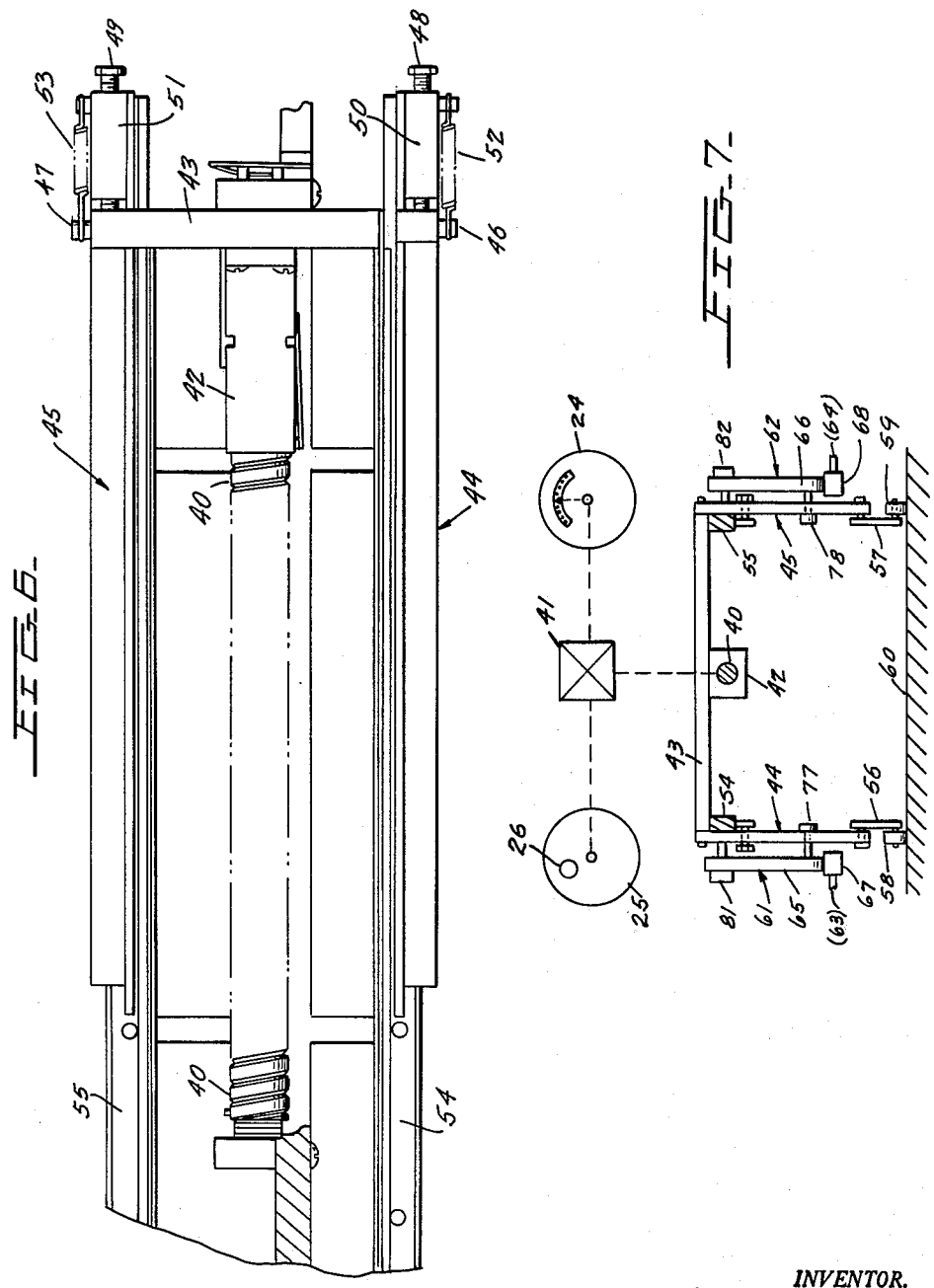
INVENTOR.
ARLING W. RYBERG
BY Richard A. Maurer

United States Patent Office 3,154,955
Patented Nov. 3, 1964

3,154,955
MICROWAVE RECEIVER TRACKING
MECHANISM
Arling W. Ryberg, Scotia, N.Y., assignor, by mesne assignments, to The Singer Company, New York, N.Y., a corporation of New Jersey
Filed Mar. 16, 1961, Ser. No. 96,118
4 Claims. (Cl. 74—107)

This invention relates generally to tunable microwave receivers, and more particularly to novel precision tracking mechanism therefor.

The receivers to which the present invention primarily pertain are for the kilomegacycle range, utilizing tunable cavities. Such receivers are useful in apparatus for microwave field intensity measurements; for RF interference measurements; for the determination of harmonic or spurious frequency output of transmitters; for local oscillator radiation measurement of receivers; for the determination of shielding effectiveness; as a tunable high sensitivity null detector; etc. Practical receivers of this type involve the range of 1 to 10 or more kilomegacycles.

In accordance with the present invention the tuning mechanism inclusive of the tunable cavities is made particularly compact. A rotary tuning drive is directly translated to linear motion that in turn operates the tunable units in unison. A lead-screw is arranged to effect precision linear correlation between the drive, the indicator, and the receiver operational frequency. Flexibly adjustable mechanism independently couples each microwave cavity section, which in turn are correlated for linear calibrated tuning.

An important advantage of the invention structural arrangement is the considerable economy of size, weight and cost for receiver coverage of the 1 to 10 kilomegacycle range. Preselection tunable cavities and a klystron cavity local oscillator are circuitally arranged to cover approximately a 2:1 frequency reception range. A common intermediate frequency output for a series of input tunable units makes it practical to utilize a common or basic receiver circuit, power supply, etc. Four plug-in tuning units, tunable over successive kmc. bands, each of 2:1 range, provides the 1 to 10 kmc. coverage with one portable equipment.

It is thus a primary object of this invention to materially reduce the space factor for the initial or first heterodyne stages of a multi-band kilomegacycle receiver incorporating tunable cavities. The invention mechanism reduces the volume of such tuning sections by the order of four-to-one over prior art systems. Further: avoidance of back-lash; precision; linearity of frequency calibration; and flexibility of assembly and tracking; render the invention arrangement practical and economical. The novel, rugged, compact tunable kilomegacycle-band units of this invention provides a unitary wide range microwave plug-in receiver.

These and further objects and advantages of the present invention will become more apparent from the following description of an exemplary embodiment thereof, illustrated in the accompanying drawings, in which:

FIG. 1 is a perspective view of an apparatus incorporating plug-in tuning units of the invention.

FIG. 2 is an elevational view at the front end of the tuning unit, with panel removed.

FIG. 3 is a top view of the unit of FIG. 2.

FIGS. 4 and 5 are respectively left and right side elevational views of the tuning unit of FIGS. 2 and 3.

FIG. 6 is an enlarged view of the lead-screw drive of the tuning unit, and the ramp sections driven thereby.

FIG. 7 is a diagram of the tuning drive per FIG. 6.

FIG. 1 is a noise and field intensity meter 15 operable in the 1 to 10 kmc. range. It is a fully shielded apparatus, with cooling air force circulated through metal mesh filtered intake 16 and honeycomb outputs 17, 18 to prevent stray signal pick-up or radiation. The honeycomb air passages provide large effective air paths with shielding effectiveness of over 100 db in the microwave range. An operational meter 19 is utilized where apparatus 15 is a field intensity meter. Other equivalent components or applications are contemplated. The plug-in tuner unit 20 is readily locked in position in the apparatus 15 by locks 21, 22. A handle 23 facilitates its positioning, plug-in engagement, and removal.

Each tuning unit 20 for the meter 15 has a predesigned frequency range. An indicator 24 is preferably on a linear frequency basis. A crank 25 manually operates the tuning, through off-center knob 26. For coarse or rapid scanning one pulls knob outwardly, and cranks in a rotary drive to drive an interior lead-screw, to be described. For vernier tuning, knob 26 is pushed inwardly and turned in either direction. Other external drive members may be employed. The exemplary vernier crank 25, 26 is the basis of my copending patent application, Serial No. 20,143, now Patent No. 3,059,481, filed on April 5, 1960, for "Control Knob With Vernier," assigned to the assignee of this case.

Typical contiguous frequency bands for successive tuning units 20 for a microwave instrument or meter, as 15, are nominally: (a) 1.0 to 2.0 kmc.; (b) 2.0 to 4.0 kmc.; (c) 4.0 to 7.0 kmc.; and (d) 7.0 to 10.0 kmc. Further bands may be employed. The four tuner units 20, (a) through (d) hereof, afford a full wide range, namely 1.0 to 10.0 kmc. of operation, in a common apparatus 15. The parts common to all the frequency bands are housed in the basic structure 15. Such comprise, for example: IF amplifier stages; peak and average reading vacuum tube voltmeter; signal attenuators 27, 28, 29; detectors; audio amplifier; and regulated power supplies. As stated hereinabove, the basic instrument or apparatus 15 may be for other desired microwave applications, with a corresponding common component complement.

The RF or microwave units 20 are interchangeable plug-in tuners, mechanically and electrically fitted in apparatus 15. Costly repetition of circuitry and components common to all the frequency bands is thus avoided. As each tuner 20 is individually pretuned and tracked, and has a common IF output frequency upon heterodyning, its calibration is intact for use in the instrument 15. Each tuner 20 is equipped with double tuned (two-stage) cavities preceding a klystron local oscillator at the first mixer stage. This greatly reduces the possibility of pulse overload and cross-modulation.

The tuning units 20 for each band (a, b, c, d) are mechanically and electrically similar in circuit and arrangement. The basic drives, linkages and mechanisms thereof are made the same, in the present invention, for economy of production and servicing. While the preselector cavity pair 30 and the klystron cavity 31 may differ in length and stroke for the different bands, the mechanical components of the invention system incorporate flexible arrangements to enable the use of a basic or comomn structure for all the tuners. Further, an important feature is that the cavity units 30 and 31 may be mounted in parallel, and reasonably close together, as shown in the drawings, with the invention control mechanism; even though their length of tuning stroke and frequency-to-displacement curves are distinct, and their stroke directions opposite.

The preselector cavity pair 30 are contiguous, with individual plungers operated by rods 32, 33 joined by plate 34. Longitudinal adjustment of rods 32, 33 controls the tuning frequency or cavity resonance of the preselector 30. The two cavities thereof are aperture coupled, and in turn preselect, and thus tune-in, impressed signals, in a manner well known in the microwave art. Electrical circuitry is omitted from the drawings, to clarify their mechanical representation. The preselector 30 output is coupled to the associated klystron unit 31, which serves as a tunable local oscillator, with a predetermined IF frequency output for the calibrated tuned-in signals. An IF of 400 mc. is an exemplary practical value.

The pre-selector 30 and klystron 31 units are driven in unison, with their plungers coupled and tracked for calibrated (linear) frequency operation. The klystron 31 is tuned through extending parallel control rods 35, 36 joined by plate 37. It is to be noted that, as viewed from the top (FIG. 3), that klystron control rods 35, 36 move into the klystron unit 31 when displaced to the right, while those of the preselector unit 30, rods 32, 33, move outwardly. This is due to the requisite reversed direction-of-stroke for the units 30, 31 in the tuning operation for the predetermined IF output. The invention control mechanism and tracking, now to be described, effects such operational mode, with a resultant compact array.

The manual crank 25 is connected to lead-screw 40 through suitable gearing indicated at 41 in FIG. 7. The indicator 24 is also coupled thereto to indicate mechanical displacements or drive in terms of frequency to which the tuner 20 is set or tuned. A follower-nut 42 is motivated along lead-screw 40 in accordance with its rotation by crank 25. A T-bar 43 fastened across follower-nut 42 operates adjustable drives for the tunable cavity units 30, 31 (see FIGS. 2, 6 and 7). A driven carriage 44, 45 is connected to each end 46, 47 of T-bar 43 through threaded adjustment rods 48, 49 set in blocks 50, 51 on top of each carriage. A spring 52, 53 connects the T-bar ends 46, 47 to corresponding carriages 44, 45. The rods 48, 49 are used to precisely adjust the carriages 44, 45 longitudinally with respect to the lead-screw 40 at the T-bar 43.

Each carriage 44, 45 is arranged to ride along a track 54, 55 precisely parallel to the lead screw 40. Pivoted spring-pressed levers 56, 57 press roller bearings 58, 59 against the base 60, providing low friction motivation for the carriages 44, 45 on their respective tracks 54, 55. The carriages are accordingly driven in unison and parallel longitudinally of the tuning units 20 in response to the cranking, fast scan or vernier, of central lead screw 40 through knob 26. The rotary drive 25, 26 is thereby translated into precise linear motion of two longitudinal carriages 44, 45.

Each carriage 44, 45 contains an angularly adjustable cam support element 61, 62 which in turn coacts with a pivoted follower 63, 64. Elements 61, 62 contain presettable ramp-like cam strips 65, 66 against which ride rollers 67, 68 of the associated followers 63, 64. The V-shaped followers 63, 64 have cross-braces 69, 70 across their open ends, with suitable spacers 71, 72. Rollers 73, 74 at the top ends of followers 63, 64 press against stop plates 75, 76 at the tunable cavities for their synchronous tuning, as will be described hereinafter.

Each cam support element 61, 62 is pivoted and angularly presettable on its associated carriage 44, 45, see FIGS. 4 and 7. Pivots 81, 82 carry one end of elements 61, 62 on their carriages. Their other end is fastened along an arcuate slot 80 in each carriage. A scale adjacent slots 80 facilitates the angular settings. Lock-nuts 77, 78 (FIG. 7) fasten the ends of the support elements in their respective slots 80, when at their desired settings. Cam strips 65, 66 on the lower sides of elements 61, 62 are of flexible ribbon steel held in tension across a close linear array of adjustable cam pins or screws 85 extending from the elements. Each cam pin 85 is transversely settable, as by hexagonal socket holes at their external tips. In this manner each strip 65, 66 is presettable as a cam face, which coact with rollers 67, 68 of followers 63, 64.

The follower arms 63, 64 are respectively pivoted at 83, 84 on chassis base 60. The upper follower rollers 73, 74 are biased outwardly of units 30, 31, whereby the race rollers 67, 68 are held pressed upwardly against cammed strips 65, 66. In this manner, when carriages 44, 45 are displaced longitudinally through lead-screw 40, as set forth hereinabove, the preset cammed strips 65, 66 thereby correspondingly adjust the positions of rollers 73, 74 at the units 30, 31.

The two control rods 32, 33 of the dual cavity preselector 30 are spring-pressed in the direction into the unit 30 by springs 86, 87 on rods 88, 89 joined by cross-plate 34, see FIGS. 3 and 5. The control rods 35, 36 of klystron 31 are spring-pressed in the direction out of the unit 31 by springs 90, 91 on rods 92, 93 joined by cross-plate 37. In this manner the cammed strips 65, 66 correspondingly control the longitudinal positions of tunable cavity units 31 and 30 respectively. The longitudinal position of the associated carriages 44, 45, as determined by crank 25 and indicated on dial unit 24, presets the angular relation of followers 63, 64 in accordance with the element 61, 62 settings and the curvature set into strips 65, 66. Corresponding longitudinal displacements of the cavity control rods of units 30 and 31 are thus derived.

The linear frequency tuning-in by indicator 24 readings is accomplished in the following manner: In each band, the tuning unit 20 has a klystron local oscillator 31 and dual pre-selector 30. Their strokes or longitudinal displacement of their respective control rods are correlated in the invention system through the elements 61, 62. The angular setting of the elements 61, 62 in their slot 80 in carriages 44, 45 are individually made so that the lowest and the highest frequencies of the particular band (on the dial 24) result. In other words, the control rod displacements of units 30, 31 by the element ends in the corresponding end-frequency carriage (44, 45) positions, are adjusted by the angular setting of each element to provide the necessary end frequency readings, and the predetermined IF output.

The cam pins or screws 85 are then adjusted at the regular intervals along the strip 65 of carriage 44 to make the klystron 31 coincide with the dial 24 frequencies. The cam screws 85 along the other strip 66 are next adjusted at the regular intervals to make the preselector 30 track to the klystron 31, and thus produce the necessary IF frequency. The basic cam shape of strips 65, 66 are thus derived step-by-step through cam pins 85, which regular steps are derived as displacements of the linear tuning dial 24.

The preselector 30 also contains an electrical tracking adjustment that permits their two tuned coupled microwave cavities or circuits to track with each other. Such adjustment consists of a series of brass screws 95, 95 along one side of each preselector cavity (see FIG. 3). These screws 95, 95 are serially adjusted to dip into the preselector 30 cavities and selectively distort their fields, and track in the required manner. In the (a) band of 1.0 to 2.0 kmc., for example, the electrical tracking adjustment is performed approximately every 100 mc. A tracking potentiometer (not shown) is geared to the mechanism hereof to adjust the klystron repellor voltage as a function of klystron 31 piston or control rod 35, 36 position, for the required frequencies.

The basic structure of the preselector and klystron units 30, 31 are mounted firmly in the tuner chassis 20. Suitable shield panels, as 96, isolate the units electrically. Further, solid transverse panels mount the respective units; as 97, 98 for klystron 31, and 99, 100 for preselector 30. Rugged microwave tuner units 20 are thus provided, with precise linear tuning mechanism that maintains its adjustment and tracking under all environmental conditions. However, the adjustability and flexibility of precise tracking of preselector and klystron, for the several microwave bands, by the invention mechanism, renders it practical and economical in production and service. Its compact arrangement affords portability and multi-band construction for a single composite apparatus or microwave instrument.

While the present invention has been set forth in connection with an examplary embodiment thereof, it is to be understood that variations and modifications in its construction and application may be made without departing from the broader spirit and scope of the invention, as set forth in the following claims.

I claim:

1. In a microwave instrument containing a tunable electrical unit with tuning means operable through a control rod: mechanism for positioning said control rod comprising a drive, a pivoted follower having one portion coacting with said rod, an elongated support element, an adjustable cam strip mounted along said element and in juxtaposition with a second portion of said follower to predeterminedly operate said control rod for tuning the unit, a member operatively displaceable by said drive, and means for mounting said element and strip on said member in adjustable relationship therewith for variably presetting the orientation of said element and strip on said member to establish said cam strip into an optimum overall tuning relation with the elecrical unit for the microwave instrument.

2. In a microwave instrument containing a tunable electrical unit of generally tubular shape with tuning means operable through a control rod positionable along its axial direction: mechanism for positioning said control rod comprising a drive, a pivoted follower having one portion coacting with said rod, an elongated support element, an adjustable cam strip mounted along said element and in juxtaposition with a second portion of said follower to predeterminedly operate said control rod for tuning the unit, a plate member operatively displaceable by said drive and having said element adjustably mounted thereon, and means for variably presetting the angular orientation of said element and strip on said plate member to establish said cam strip into an optimum overall tuning relation with the electrical unit for the microwave instrument.

3. In a microwave instrument as claimed in claim 1 containing a second tunable electrical unit positioned parallel with the first electrical unit and with second tuning means operable through a second control rod positionable along the common axial direction of the units: said mechanism further including a carriage operatively coupled to said drive for controllable displacement in said axial direction, a second member, said first and second members being secured with said drive-displaceable carriage for in turn tuning the units, a second elongated support element and a second adjustable cam strip carried thereby, said second element and strip being mounted on said second member in adjustable relation therewith, second means for variably presetting the orientation of said element on said second member, a second follower with one portion coacting with said second control rod and another portion with the second strip to predeterminedly tune the second electrical unit in correlation with the first unit, said first and second members being secured with said carriage in parallel relationship and in the axial direction for unitary circuit operation in tracked relation for optimum tuning of the microwave instrument.

4. In a microwave instrument as claimed in claim 2 containing a second tunable electrical unit positioned parallel with the first electrical unit and with second tuning means operable through a second control rod positionable along the common axial direction of the units: said mechanism further including a carriage operatively coupled to said drive for controllable displacement in said axial direction, a second plate member, said first and second plate members being secured with said drive-displaceable carriage for in turn tuning the units, a second elongated support element and a second adjustable cam strip carried thereby, said second element and strip being mounted on said second member in adjustable relation therewith, second means for variably presetting the angular orientation of said element on said second plate member, a second follower with one portion coacting with said second control rod and another portion with the second strip to predeterminedly tune the second electrical unit in correlation with the first unit, said first and second members being secured with said carriage in parallel relationship and in the axial direction for unitary circuit operation in tracked relation for optimum tuning of the microwave instrument through the said common drive.

References Cited in the file of this patent

UNITED STATES PATENTS

| | | |
|---|---|---|
| 1,879,294 | Jones et al. | Sept. 27, 1932 |
| 2,336,550 | Kruper | Dec. 14, 1945 |
| 2,568,762 | Rabinow | Sept. 25, 1951 |
| 2,633,036 | Winter | Mar. 31, 1953 |
| 2,669,699 | Shapiro | Feb. 16, 1954 |
| 2,860,248 | Lyman | Nov. 11, 1958 |
| 2,871,345 | Napolin | Jan. 27, 1959 |
| 2,921,187 | Jaffe et al. | Jan. 12, 1960 |